United States Patent
Schunk

(10) Patent No.: US 7,250,307 B2
(45) Date of Patent: Jul. 31, 2007

(54) PROCESS AND APPARATUS FOR TRANSFERRING AIR-SENSITIVE SUBSTANCES

(75) Inventor: Stephan A. Schunk, Heidelberg (DE)

(73) Assignee: hte Aktiengesellschaft the high throughput experimentation company, Heidelberg (DE)

(*) Notice: Subject to any disclaimer, the term of this patent is extended or adjusted under 35 U.S.C. 154(b) by 287 days.

(21) Appl. No.: 09/997,285

(22) Filed: Nov. 30, 2001

(65) Prior Publication Data

US 2002/0089868 A1 Jul. 11, 2002

(30) Foreign Application Priority Data

Dec. 1, 2000 (DE) .............................. 100 59 633.9

(51) Int. Cl.
*G01N 30/00* (2006.01)
(52) U.S. Cl. .................... 436/174; 436/180; 422/99; 422/100; 422/102; 422/103; 422/104
(58) Field of Classification Search .................. 422/99, 422/100, 102, 103, 104; 436/180
See application file for complete search history.

(56) References Cited

U.S. PATENT DOCUMENTS

| | | | | |
|---|---|---|---|---|
| 4,546,897 A | * | 10/1985 | Maloy et al. ............... | 220/277 |
| 6,030,917 A | | 2/2000 | Weinberg et al. | |
| 6,045,755 A | * | 4/2000 | Lebl et al. .................... | 422/65 |
| 6,149,882 A | * | 11/2000 | Guan et al. .................. | 422/211 |

FOREIGN PATENT DOCUMENTS

| | | |
|---|---|---|
| EP | 0 277 004 | 8/1988 |
| EP | 0 582 016 B1 | 4/1997 |
| EP | 0 894 257 B1 | 7/2000 |

OTHER PUBLICATIONS

F. Bonini et al., *Propylene Polymerization through Supported Metallocene/MAO Cataolysts: Kinetic Analysis and Modelling*, Journal of Polymer Science: Part A: Polymer Chemistry, 1995, vol. 33, pp. 2393-2402.

J. A. Gladysz, *Frontiers in Metal-Catalyzed Polymerization: Designer Metallocenes, Designs on New Monomers, Demystifying MAO, Metathesis Déshabillé.* Chemical Reviews, Apr. 2000, vol. 100, No. 4.

* cited by examiner

*Primary Examiner*—Jill Warden
*Assistant Examiner*—Samuel P. Siefke
(74) *Attorney, Agent, or Firm*—Jones Day

(57) ABSTRACT

A process is provided for transferring and releasing substances which are air-sensitive or moisture-sensitive or light-sensitive, or air-sensitive and moisture-sensitive, or air-sensitive and light-sensitive, or moisture-sensitive and light-sensitive, or air-sensitive, moisture-sensitive and light-sensitive, at least one substance (20) which is air-sensitive or moisture-sensitive or light-sensitive, or air-sensitive and moisture-sensitive, or air-sensitive and light-sensitive, or moisture-sensitive and light-sensitive, or air-sensitive, moisture-sensitive and light-sensitive. The process comprises removing the substances after preparation under a protective gas atmosphere, from a synthesis chamber, wherein, during said removing, the substances are surrounded by at least one means (32, 34) for protecting the substances and then transferring the substances to at least one test reactor (50, 60), wherein the transfer takes place in a protective-gas-free chamber and at least one substance (20) is freed in the test reactor (50, 60) from the means (32, 34) protecting it using at least one apparatus or by means of at least one process.

13 Claims, 5 Drawing Sheets

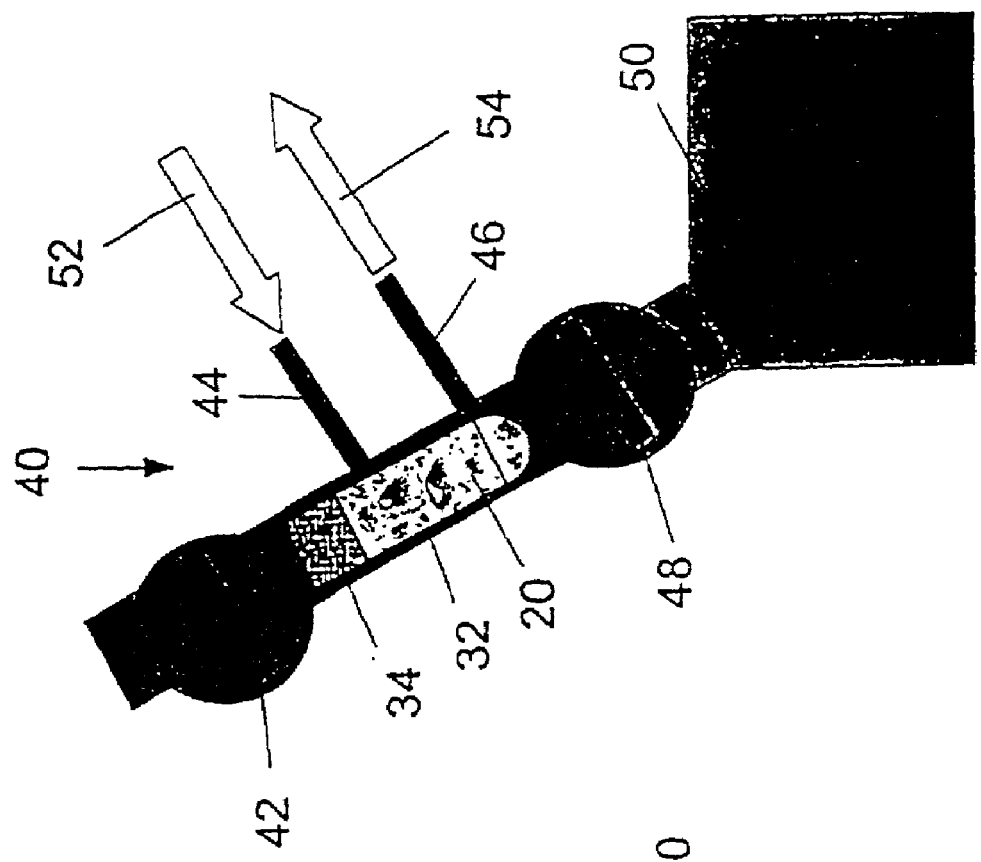
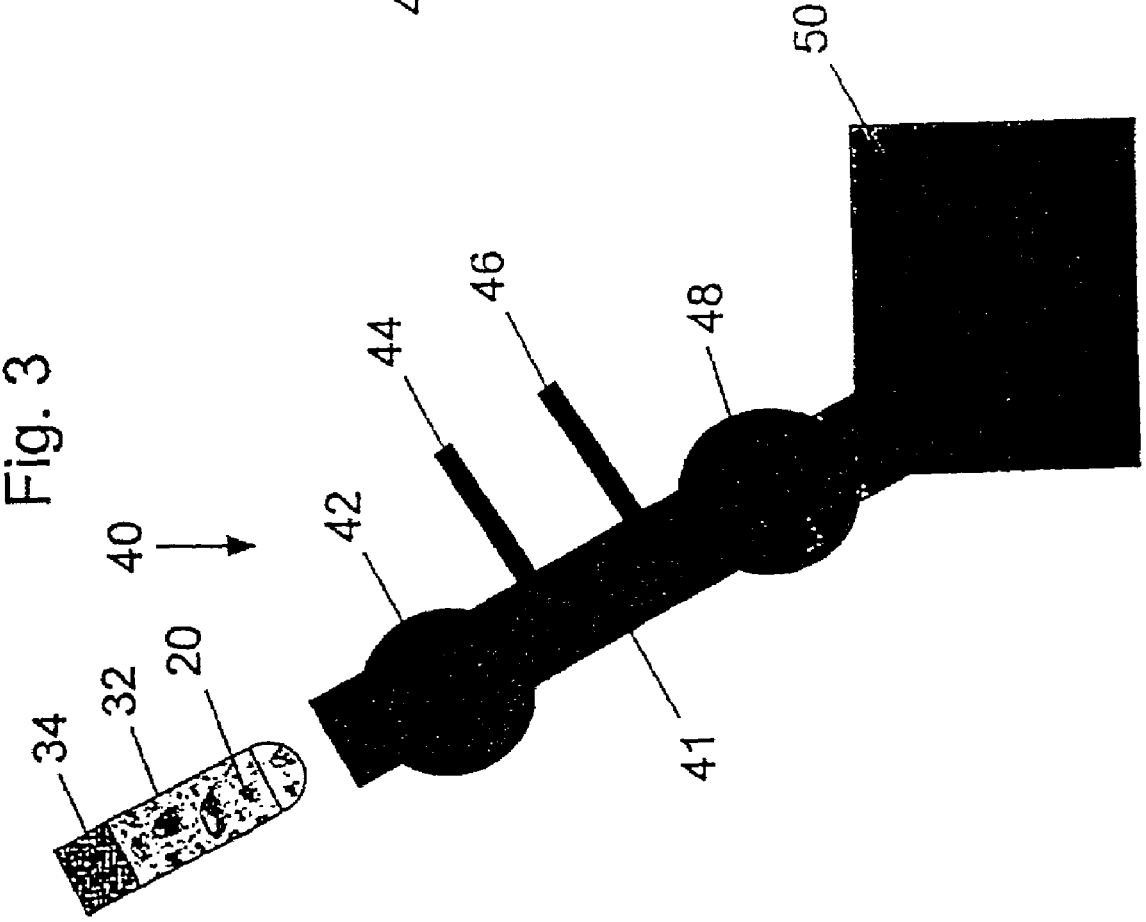

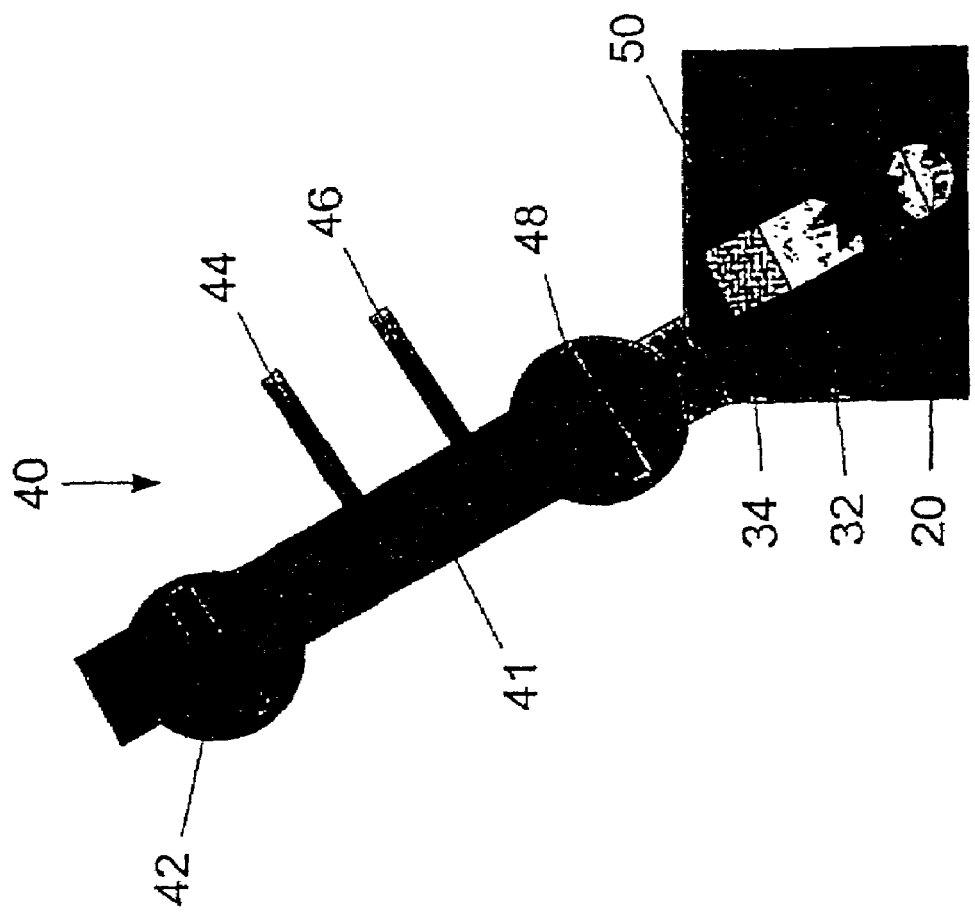
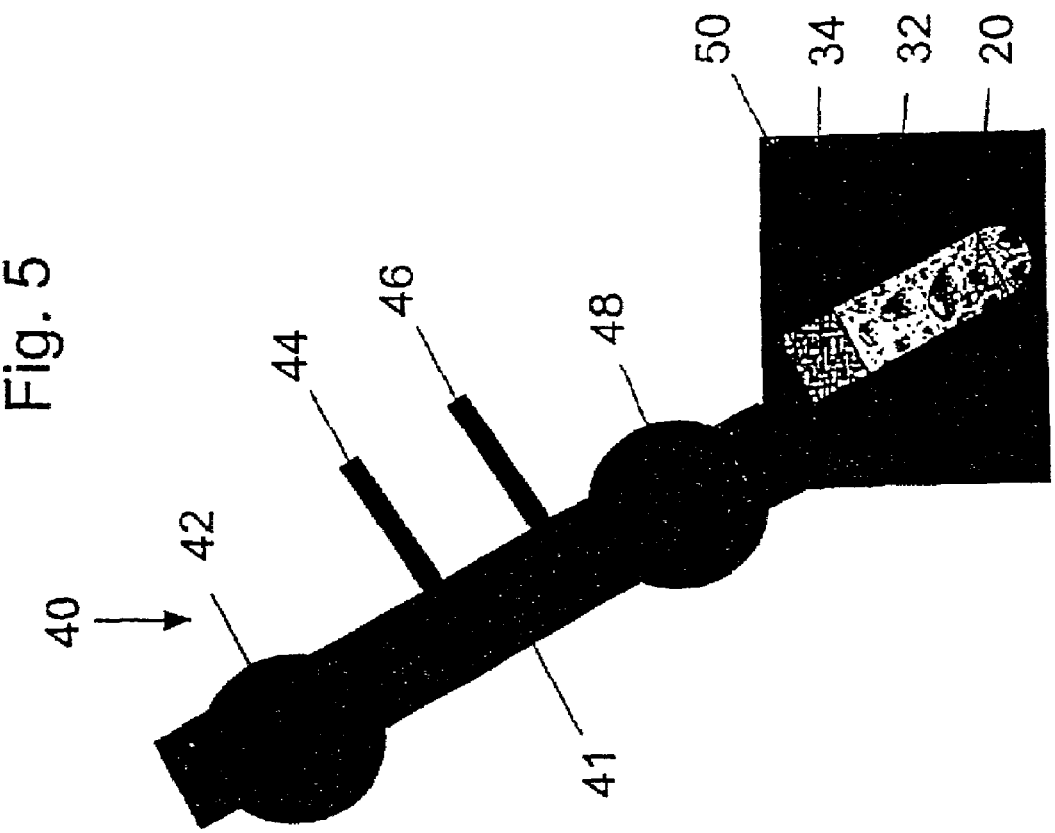

PROCESS AND APPARATUS FOR TRANSFERRING AIR-SENSITIVE SUBSTANCES

BACKGROUND OF THE INVENTION

1. Field of Invention

The present invention relates to a process for transferring air-sensitive and/or light-sensitive and/or moisture-sensitive substances. According to the invention these substances are transferred from a synthesis chamber which is filled with protective gas into a test reactor, which is also flooded with protective gas, for activation there. The present invention further relates to an apparatus for carrying out the process. The transfer itself, however, does not take place under protective gas conditions.

2. Description of Related Art

Test methods are known to date in which the test reactor is provided within the synthesis chamber. In this case, the air-sensitive substances, on transfer from the synthesis chamber into the test reactor, do not leave the protective gas atmosphere. The substances are activated while they are still in the synthesis chamber. These methods, however, have the disadvantage that substances, particularly those which are only stable to a limited extent after their activation and cannot be exposed to relatively long storage, must be transferred immediately to the test reactor in order to achieve useable test results. In addition, there is the problem here that only a limited amount of substances can be prepared and activated. That is to say only as much as can also be tested in the test reactor can be prepared and activated (U.S. Pat. No. 6,030,917).

SUMMARY OF THE INVENTION

An object underlying the present invention is to provide a process for transferring air-sensitive substances which enables the air-sensitive substances to be transferred from a synthesis site to a test reactor without the presence of a protective gas atmosphere and without being activated until in the test reactor.

In accomplishing the foregoing and other objects of the invention, there has been provided, according to one aspect of the invention, a process for transferring and releasing substances which are air-sensitive and/or moisture-sensitive and/or light-sensitive, comprising removing at least one air-sensitive and/or moisture-sensitive and/or light-sensitive substance, after preparation under a protective gas atmosphere, from a synthesis chamber. During the step of removing, at least one means for protecting the substance surrounds the substance. The process further comprises transferring the substance from the synthesis chamber to at least one test reactor. The transferring occurs in a protective-gas-free environment, and, the process further comprises freeing at least one substance, in the test reactor, from the means protecting said substance.

According to another aspect of the present invention, there has been provided a process for transferring and releasing substances which are air-sensitive and/or moisture-sensitive and/or light-sensitive, comprising removing at least one air-sensitive and/or moisture-sensitive and/or light-sensitive substance, after preparation under a protective gas atmosphere, from a synthesis chamber. During the step of removing, at least one sealed vessel for protecting said substance surrounds said substance. The process further comprises transferring said substance from said synthesis chamber to at least one test reactor. The transferring occurs in a protective-gas-free environment. Additionally, the process comprises freeing at least one substance, in the test reactor, from the sealed vessel protecting the substance.

A further aspect of the present invention provides for an apparatus for transferring and releasing air-sensitive and/or moisture-sensitive and/or light-sensitive substances. The apparatus comprises a synthesis chamber for preparing an air-sensitive and/or moisture-sensitive and/or light-sensitive substance and enclosing the substance within means for protecting the substance a test reactor. The apparatus further comprises means for transferring the substance from the synthesis chamber to the test reactor and means for freeing, within the test reactor, the substance from the means for protecting the substance.

Yet another aspect of the invention provides for an apparatus for transferring and releasing air-sensitive and/or moisture-sensitive and/or light-sensitive substances. The apparatus comprises a synthesis chamber for preparing an air-sensitive and/or moisture-sensitive and/or light-sensitive substance and enclosing the substance within a sealable vessel for protecting the substance. The apparatus further comprises a test reactor and an electronically-controlled, fully-automatic apparatus or a robot for transferring the substance from the synthesis chamber to the test reactor.

In addition, the present invention relates to a computer program having program code means for carrying out the inventive process, and to a data carrier comprising such computer programs. Specifically, the invention includes, according to one embodiment, a computer readable data storage medium having computer code recorded on it executable by a computer. The computer program code includes a first program code for removing at least one air-sensitive and/or moisture-sensitive and/or light-sensitive substance, after preparation under a protective gas atmosphere, from a synthesis chamber, wherein during said removing, at least one means for protecting said substance surrounds said substance. The program code further comprises a second program code for transferring said substance from said synthesis chamber to at least one test reactor, wherein said transferring occurs in a protective-gas-free environment, and, a third program code for freeing at least one substance, in the test reactor, from the means protecting said substance.

Further objects, features and advantages of the present invention will become apparent from the detailed description of preferred embodiments that follows when considered together with the accompanying drawings.

BRIEF DESCRIPTION OF THE DRAWINGS

The present invention is described in detail below with reference to one exemplary embodiment and with reference to the accompanying drawings in which:

FIG. 3 shows a diagrammatic representation of a test reactor having an open lock before introduction of a vessel into the lock;

FIG. 4 shows a diagrammatic representation of a test reactor having a closed lock during an inert gas purge cycle;

FIG. 5 shows a diagrammatic representation of a test reactor having a lock opened on the reactor side for introducing the vessel into the reactor;

FIG. 6 shows a diagrammatic representation of a test reactor having a closed lock during opening of the vessel in the reactor.

DETAILED DESCRIPTION OF THE PREFERRED EMBODIMENTS

Figure 1:
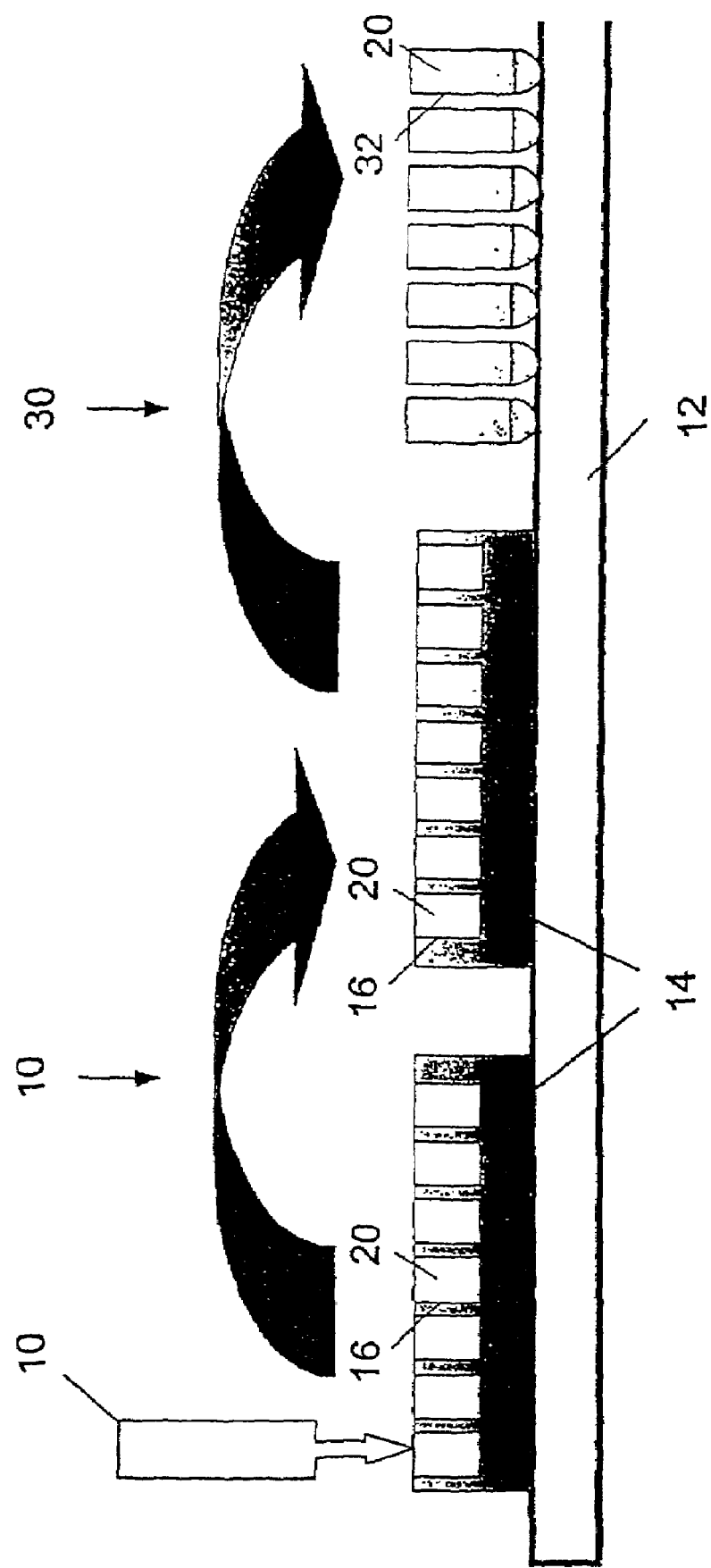
FIG. 1 shows a diagrammatic representation of a synthesis of air-sensitive substances carried out underprotective gas and their transfer into vessels.

According to a preferred embodiment of the invention, for example, the foregoing objects are achieved by a process for transferring and releasing substances which are air-sensitive or moisture-sensitive or light-sensitive, or air-sensitive and moisture-sensitive, or air-sensitive and light-sensitive, or moisture-sensitive and light-sensitive, or air-sensitive, moisture-sensitive and light-sensitive, wherein at least one substance (20) which is air-sensitive or moisture-sensitive or light-sensitive, or air-sensitive and moisture-sensitive, or air-sensitive and light-sensitive, or moisture-sensitive and light-sensitive, or air-sensitive, moisture-sensitive and light-sensitive. This process comprises removing the substances, after preparation under a protective gas atmosphere, from a synthesis chamber, wherein, during said removing, the substances are surrounded by at least one means (32, 34) for protecting the substance and then transferring the substances to at least one test reactor (50, 60), wherein the transfer takes place in a protective-gas-free chamber and at least one substance (20) is freed in the test reactor (50, 60) from the means (32, 34) protecting it using at least one apparatus or by means of at least one process. For the sake of simplicity, the air-sensitive and/or light-sensitive and/or moisture-sensitive substance (20) is referred to below as "air-sensitive substance".

Such substances which can be transferred by the process according to the present invention comprise air-sensitive and/or moisture-sensitive and/or light-sensitive substances of organic, inorganic and biological nature and/or origin. Examples which may be mentioned include, for example, substances which are suitable as catalysts, moderators and activators, enzymes, peptides, polypeptides, cells and other biological systems.

Preferably, the process is suitable for transferring air-sensitive substances selected from homogeneous catalysts such as, for example, organometallics, and activators such as, for example, methylaluminoxanes, Al-alkyl compounds and boron fluorides, such as, for example, those described in EP-A 0 277 004, an article by Bonini et al. in J. Polym. Sci, 33, 2393-2402 (1995) and Chemical Reviews "Frontiers in metal-catalyzed polymerization", April 2000, Vol 100, No. 4, all expressly incorporated by reference in their entities, and heterogeneous catalysts, such as, for example, metallic catalysts without passivation and pseudo organometallic catalysts.

Particularly preferably, the process is suitable for transferring the following air-sensitive substances: metallocenes and postmetallocenes. Such post metallocenes can be based on LTM (late transition metal) or ETM (early transition metal).

The substances to be transferred are typically prepared in a synthesis chamber, for example under a protective gas atmosphere. Suitable synthesis chambers or synthesis apparatuses include, for example, gloveboxes, Schlenck-type flasks and Schlenck-type lines, and Stock vacuum apparatuses.

The protective gas atmosphere is typically chosen on a case-by-case basis such that the substance to be prepared is not contaminated by traces of atmospheric oxygen or other trace gases present in the room air such as carbon dioxide or moisture during its preparation process. In one preferred embodiment of the present invention, operations are carried out with exclusion of air in an argon atmosphere. Preferably, the atmosphere present in the synthesis chamber is purified during and after the preparation by suitable purification and filter units or other suitable apparatuses, for example a glovebox, in order to remove any contaminants due to introduction of the starting materials required for preparation of the substance, or any contaminants co-introduced by the introduction operation itself.

Protective gases to be used are in principle all protective gases known for this purpose. Those which may be mentioned individually include, for example, nitrogen, noble gases, for example argon and helium, and mixtures of two or more thereof.

Obviously, in the context of the present invention, purging can be carried out using a plurality of protective gases in succession, in order to avoid, virtually completely, or exclude contamination of the substances under test.

The synthesis chamber of the inventive process is preferably a glovebox.

The term glovebox is to be taken to mean an air-tight box in which, using welded-on rubber gloves, manipulations may be performed from the outside and, for example, chemical reactions can be performed under a protective gas atmosphere.

After the substances have been prepared, these are, according to a preferred embodiment of the present invention, enclosed by a means protecting them. This corresponds to transfer into a suitable vessel and its sealing. In this case, the vessel material should be inert with respect to the substances or components present therein such as, for example an organometallic catalyst, an activator, a moderator, reactants and possibly, other reagents, such as reaction inhibitors which may be added later, for example water or alcohol. This is necessary in order to prevent unwanted decomposition of the air-sensitive substances. Suitable vessel materials include preferably glass, plastics such as polyolefins such as, for example, PE, PP and their copolymers with higher olefins, PVC, metals, ceramics and composite materials of the above mentioned materials.

Particular preference is given to glass, ceramics and composite materials made of glass, ceramics and plastic, and to tinted materials or materials having special light-protecting layers.

Typically, the vessel is sealed using a suitable cover or cover material. If the vessel consists of glass, it can be fused for sealing. If a physically solid cover is applied, this can consist of the same material or a material different from the vessel material. Suitable materials are also the above-mentioned vessel materials. In addition, the vessel can be sealed with a film, for example Parafilm®. Finally, it is possible to seal the vessel with curable or viscous materials such as resins, polymers, waxes, amalgams, curable polymers or perfluorinated oils and waxes, in which case these materials can be applied, for sealing, in a comparable manner to a droplet onto the vessel.

Particularly preferably the sealing is performed using the curable or viscous materials as just described above.

These materials should also interact as little as possible with substances or components.

The specified vessel materials and cover materials can, optionally, also be soluble in the solvent present in the test reactor, as a result of which dissolution of the vessels and/or cover materials is possible. It is important in this case that the said means for sealing the vessels ensure an effective seal from the environment, in particular environmental influences, during transfer of the vessels from the synthesis site to the test reactor.

Such described vessels are also suitable for transferring activators, moderators or other sensitive substances which include, for example, enzymes, bacteria, other cells, biological systems, peptides or polypeptides.

These air-sensitive substances enclosed in the vessels can be solid, liquid or gaseous, in which case they are preferably solid or liquid, most preferably solid.

Typically, the transfer is not performed under a protective gas atmosphere. Thus, the protective-gas-free space between synthesis chamber and test reactor can, for example, have atmospheric conditions or clean-room conditions as well as atmospheres comprising light, air and water.

Any desired test reactor can be used for the inventive process. Customarily the reactor is a stirred reactor or pressure vessel having suitable stirring devices. Preferably, automated continuous or batch-operated stirred reactors in parallel are used.

According to a preferred embodiment of the inventive process, at least one air-sensitive substance is activated in the test reactor using at least one activator.

The activators used to activate the air-sensitive substances in the test reactor are preferably methylaluminoxanes to activate metallocenes and postmetallocenes, or cofactors and coenzymes tc activate enzymes.

Activation is performed, according to a preferred embodiment of the present invention in the test reactor, preferably, immediately before the substances are tested.

According to another preferred embodiment of the invention it is also possible to modify at least one air-sensitive substance in the test reactor using at least one moderator.

The moderators used for moderating the air-sensitive substances in the test reactor are preferably organic or inorganic agents, particularly preferably olefins or diolefins being used to modify metallocenes.

The test reactor preferably has a lock which is charged with inert gas at superatmospheric pressure.

The use of a lock avoids contaminations, differing from, for example, a septum, and is simple to automate.

The lock, according to a preferred embodiment of the present invention, is a conventional single-chamber lock, which makes it possible to introduce the air-sensitive substances from a protective-gas-free atmosphere outside the test reactor into the test reactor which is flooded with protective gas. The lock is preferably mounted on the test reactor, which means that both lock doors are outside the test reactor. The connection to the test reactor is preferably fixed and gas-tight. Alternatively, a lock which is integrated or partly integrated in the test reactor is possible. For improved exchangeability, in particular, for increasing the flexibility when using differing vessel sizes, a detachable connection between lock and test reactor can be provided in order to allow use of differing lock sizes or lock types. This connection can be provided, for example, as screw or bayonet connection having corresponding seal elements. The different lock types are preferably single-chamber and multichamber locks, the latter making possible the simultaneous lock-mediated inward transfer of a plurality of vessels having, for example, different vessel sizes. Matching the lock size to the vessel size is advisable owing to the costs of the inert gas used each time.

On lock-mediated inward transfer of the air-sensitive substances into the test reactor, after the lock has been charged with an inert gas at superatmospheric pressure, the lock is opened on the side facing away from the test reactor, the closed vessel containing the air-sensitive substance is transported into the lock and the lock is closed again. Then there is preferably an intensive purge cycle with inert gas in which even the final amounts of ambient air and contaminants due to the ambient atmosphere are excluded. Such purge cycles can also be carried out using pressure changes in the form of a sequence of cleaning—evacuation—cleaning of the lock. Finally the lock is brought to a pressure, using inert gas or reaction gas, which is higher than the pressure of the test reactor to be filled. The pressure difference should be in the range from 0.001 to 10 bar. Preferably the pressure difference should have a value within the range from 0.01 to 0.3 bar. Particularly preferably, an overpressure in the lock of 0.05 to 0.5 bar compared with the pressure within the test reactor is to be set. By opening the side of the lock facing the test reactor the closed vessel together with the air-sensitive substance contained therein is transported into the test reactor. The lock is then closed again.

The inert gas used for purging the lock is preferably argon, nitrogen, helium or mixtures of two or more thereof. Particularly preferably, nitrogen is used.

In a further preferred embodiment, only the test reactor is charged with inert gas at an overpressure which prevents ingress of the ambient atmosphere. For the lock-mediated inward transfer of the vessels, a suitable opening provided on the test reactor is opened and the vessel or vessels are transported therein. This step can be carried out manually or automatically. The opening is then closed again.

In a third preferred embodiment, the air-sensitive substances are transferred into the test reactor by an alternative loading apparatus. This arrangement in which, as also in the above-described embodiments, the test reactor is situated outside the synthesis chamber, is suitable preferably for using a plurality of test reactors, which are connected to the synthesis chamber via a fluid coupling and a multiport valve or a multiplexer valve. In this case the substances are passed from the synthesis chamber via the fluid coupling and the multiport valve into the various test reactors. The various catalysts, activators or else moderators are dissolved in this case and are taken in by a pump, the multiport valve deciding via its position which test reactor is charged with liquid.

Furthermore, in all embodiments described, the use of a plurality of test reactors is possible, as is also the use of a plurality of synthesis chambers.

By means of the above-described first two embodiments, the test reactor can be charged with vessels of the organometallic complex, the activator, the moderator and other agents or substances.

In addition, it is possible that a plurality of vessels having a plurality of air-sensitive substances are introduced into a test reactor, in which case it must still be decided whether a plurality of substances are present in one vessel which, if required, can be separated from one another by partitions, or a plurality of vessels each containing one substance can be introduced into the test reactor. In accordance with the inventive process, it is thus also possible to introduce into the test reactor at least two identical or two different catalytically active substances, in each case enclosed by a means protecting them. This advantage of the scaleability of addition via vessels, for example twice the amount of catalyst can be achieved by addition from two vessels, simplifies handling with the sensitive materials and saves sometimes complex automated addition systems.

In the case of the solubility of the vessel material 25 and/or vessel cover material, the protective means enclosing the air-sensitive substance is removed according to the invention by dissolving the protective means in a solvent. The dissolution can if appropriate be accelerated by increasing the temperature.

Solvents in which the air-sensitive substances are dissolved and which can be used are in principle all solvents which can readily be used for the respective substance.

In the case of the inventive transfer of metallocenes, preferably alkanes and/or aromatics are used.

Particularly preferably, alkanes are suitable as solvents in this context. Thereafter the activation and/or moderation of the organometallic complexes is performed. This can be performed before, during or after the final reaction conditions are established under which the test is to take place.

If the vessel material and/or vessel cover material are insoluble materials, the protective means enclosing the air-sensitive substance, in order to release the air-sensitive substances, is mechanically destroyed in accordance with a preferred embodiment of the inventive process using an apparatus provided in the test reactor. The apparatus preferably has at least one moving element. The moving element preferably consists of a rotating stirring element rotating about its own axis.

The stirring element is preferably a propeller, an arm provided perpendicularly to the axis of rotation, a disk agitator, or a gas-dispersion agitator.

Particularly preferably a disk agitator is suitable as stirring element.

In this embodiment also, in which, in accordance with the inventive process, the protective means enclosing the air-sensitive substance is mechanically destroyed using an apparatus provided in the test reactor, the activation and/or moderation of the organometallic complexes is performed in the test reactor, in which case this can be performed before, during or after the final reaction conditions are established under which the test is to take place.

According to a further embodiment, the air-sensitive substances can be released in the test reactor even without an apparatus provided in the test reactor. In this case the air-sensitive substances are also released by mechanical destruction of the vessel material and/or vessel cover material. The materials protecting the air-sensitive substances are destroyed in this case, however, by impacting the vessel in the test reactor. This becomes possible if the overpressure in the lock mounted before the test reactor is at an appropriately higher pressure than the pressure prevailing in the test reactor so that the vessel, on entry into the test reactor is sufficiently accelerated in order to be destroyed on impact with the test reactor. After release of the air-sensitive substances, in this case also activation and/or moderation of the organometallic complexes occurs, in which case this can occur before, during or after the final reaction conditions are established under which the test is to take place.

In a further preferred embodiment, the vessels have suitable electronics and mechanics, preferably microelectronics and micromechanics, so that the vessels, after they have been introduced into the test reactor, can be opened by a signal from the outside. In this case also activation and/or moderation of the organometallic complexes takes place, in which case this can also take place before, during or after the final reaction conditions have been established under which the test is to take place.

The above-described inventive processes for releasing the air-sensitive substances can obviously also be combined, in order, for example, during the activation and/or moderation of organometallic complexes, to avoid simultaneous release of all substances. When a plurality of vessels having different materials are used, it is possible, first, for mechanical destruction of one vessel to take place, with the other vessel or vessels opening by dissolution or by means of an external signal, if electronics and mechanics are present.

In accordance with an embodiment of the inventive method, at least two identical, or two different air-sensitive, preferably catalytically active, substances, in each case enclosed by a means protecting them, can be introduced into the test reactor.

According to the present invention, the air-sensitive substances are transferred from the synthesis chamber into at least one test reactor using at least one apparatus, of which at least one apparatus is an electronically controlled fully automatic apparatus. This apparatus is preferably a conventional robot. Particularly preferably, a combination of robot, multiport valve pump and multiport valve (stream selector) is used.

Further forms of this apparatus can be in the use or combination or a plurality of multiport valves which themselves can have different types.

According to the present invention, the apparatus is used for carrying out the inventive process on air-sensitive substances.

In addition, the present invention relates to a computer program having program code means for carrying out the inventive process, and to a data carrier comprising such computer programs. Specifically, the invention includes, according to one embodiment, a computer readable data storage medium having computer code recorded on it executable by a computer. The computer program code includes a first program code for removing at least one air-sensitive and/or moisture-sensitive and/or light-sensitive substance, after preparation under a protective gas atmosphere, from a synthesis chamber, wherein during said removing, at least one means for protecting said substance surrounds said substance. The program code further comprises a second program code for transferring said substance from said synthesis chamber to at least one test reactor, wherein said transferring occurs in a protective-gas-free environment, and, a third program code for freeing at least one substance, in the test reactor, from the means protecting said substance Turning now to the figures, the synthesis 10 shown in FIG. 1 of the air-sensitive substances is performed under a protective gas atmosphere in a synthesis chamber and preferably in a plurality of steps. In this case the synthesis arrangement comprises a carrier 12, which forms the base for at least one substance carrier 14 having substance receiving means 16 provided thereon, which means are charged using a substance metering unit 18. After the synthesis has been carried out, the substance receiving means 16 have substances, preferably air-sensitive substances 20, which can be provided for subsequent testing by means of a transfer 30 into vessels 32, also disposed on the carrier 12. In this case, the carrier 12 can also be in a plurality of parts.

Figure 2:
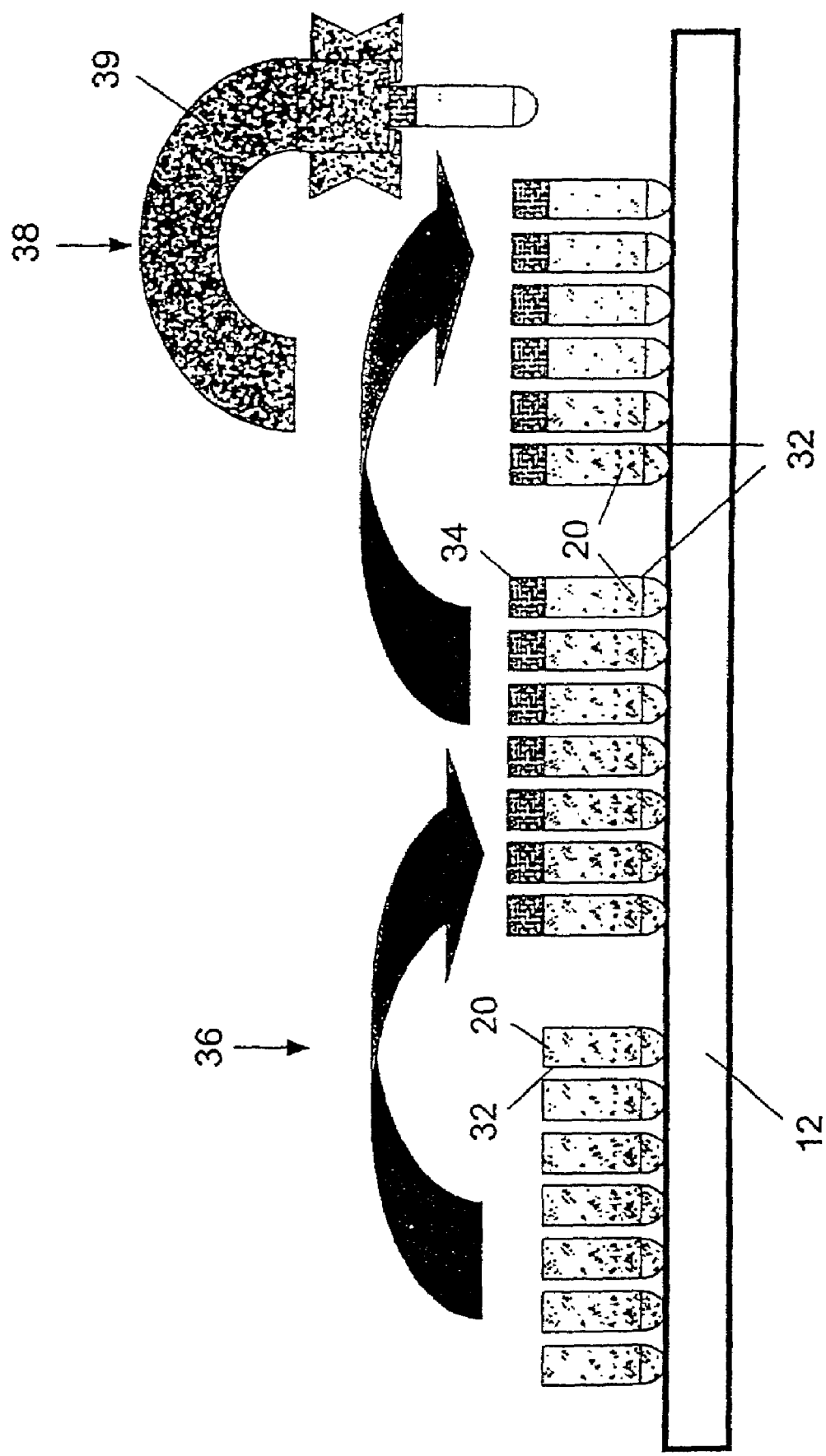
FIG. 2 shows a diagrammatic representation of a sealing operation of the vessels and their transfer from the protective gas atmosphere.

As shown in FIG. 2, the vessels 32, after their charging with the preferably air-sensitive substances 20, are sealed, which, as shown, is preferably carried out using gas-tight covers 34. This sealing of the vessels 32 is performed using an apparatus 36, with different closure materials such as resins, polymers, waxes, ceramics, amalgams, films, curing or viscous fluids or perfluorinated oils and waxes being able to be used. After the vessels 32 have been sealed gas-tightly, they are transferred 38 a suitable apparatus, preferably a robot 39, from the synthesis chamber, in which case the vessels 32 leave the protective gas conditions which prevail in the synthesis chamber.

For subsequent testing, the vessels 32 are transferred into test reactors 50 which have a lock 40. The individual steps for introducing a vessel 32 into a test reactor 50 are shown in FIGS. 3 to 5.

FIG. 3 shows the introduction of a vessel 32 into the lock 40. The lock 40 comprises a lock chamber 41, two lock doors 42, two gas connection ports 44, 46 and is provided as lock 40 mounted on the test reactor, in which the two lock doors 42, 48 are situated outside test reactor 50. The lock 40 is mounted on the test reactor 50 in such a manner that the lock door 42 is situated on the side of the lock 40 which faces away from the test reactor and the lock door 48 is on the side facing the test reactor. The lock door 42 preferably serves for inward transfer of the vessels 32 into the lock chamber 41, whereas the lock door preferably serves for discharge of the vessels 32 from the lock chamber 41 into the test reactor 50. The two gas connection ports 44, 46 are a gas filling port 44 for filling the lock chamber 41 with, for example, inert gas and a gas outlet port 46 for discharging the gas situated in the lock chamber, which ports are disposed between the lock doors 42, 48 open into the lock chamber 41.

During inward transfer of a vessel 32 into the lock chamber 41, the lock door 42 is opened, with the lock door 48 remaining closed. The vessel 32 is introduced via the opened lock door 42 into the lock chamber 41 and the lock door 42 is closed again.

Then, as shown in FIG. 4, with closed lock doors 42, 48, inert gas is passed through the lock chamber 41, during which the vessel 32 is surrounded by inert gas. During the purging, the inert gas flows through the gas filling port 44, indicated by the arrow 52, into the lock chamber 41, flows round the vessel 32 and then leaves the lock chamber 41 via the gas outlet port 46, indicated by the arrow 54.

After purging the vessel 32 has been completed, the lock chamber is pressurized with the inert gas present therein by firstly closing the gas outlet port 46 and then setting an overpressure lying within the possible adjustment range using the gas feed via the gas filling port 44.

Because of the overpressure in the lock chamber 41 compared with the pressure which prevails in the interior of the test reactor 50, when the lock door 48 35 is opened, the vessel 32 is discharged, which corresponds to introduction into the test reactor 50. Depending on the pressure difference between lock chamber 41 and interior of the test reactor 50, introduction into the test reactor 50 takes place at low or high acceleration of the vessel 32, as shown in FIG. 5.

After the lock door 48 has been closed again, in accordance with FIG. 6 the vessel 32 is opened in the test reactor under a protective gas atmosphere. The vessel 32 is opened here as shown by mechanical destruction of the vessel 32 on impact on the bottom of the test reactor 50. Particularly suitably for an opening of this type of the vessels 32, the vessel material is glass. The air-sensitive substance 20 thus released can then be tested under the conditions established in the test reactor 50.

Figure 7:
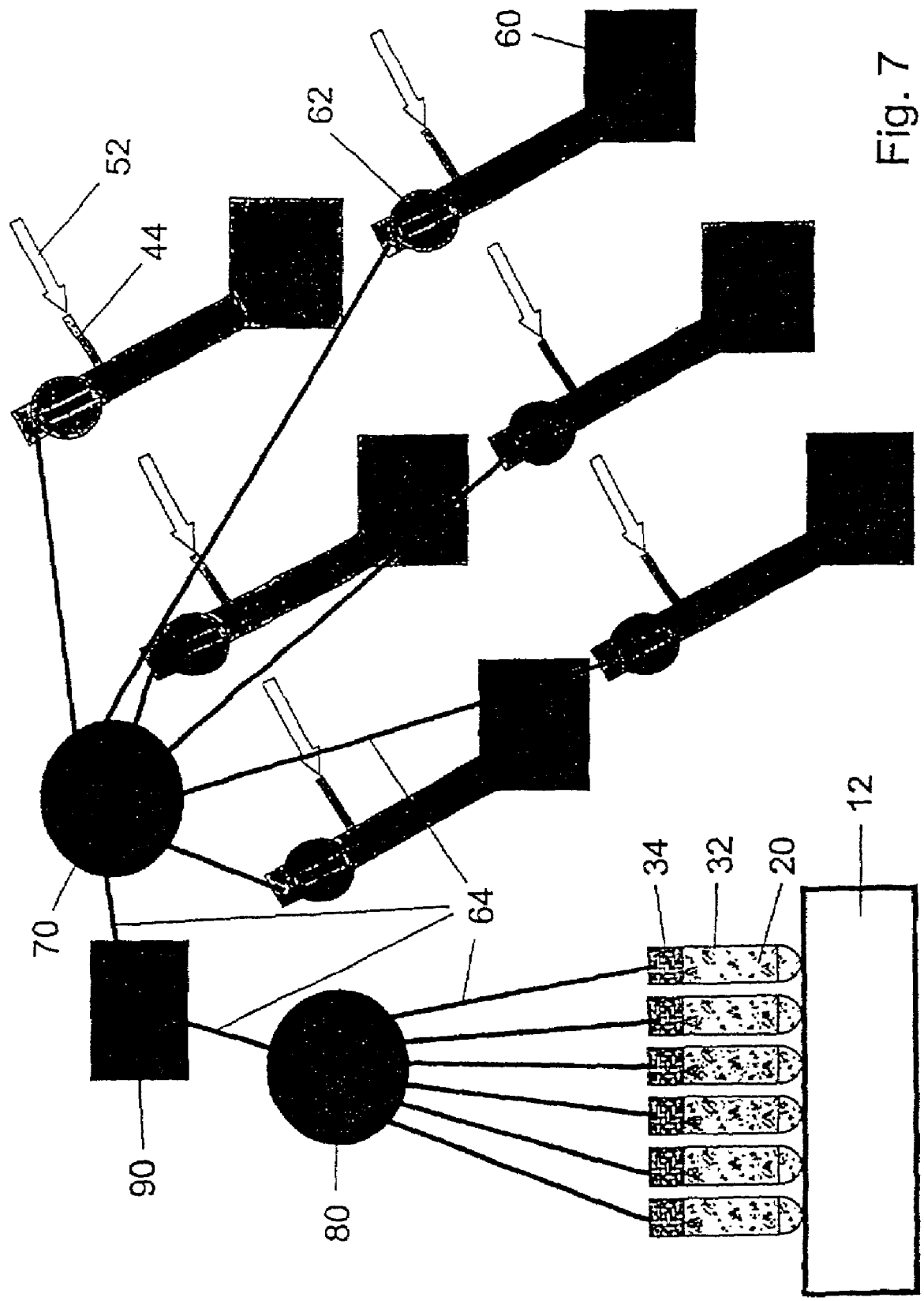
FIG. 7 shows a diagrammatic representation of an arrangement for selecting a substance and its distribution from the vessels into various test reactors.

FIG. 7 shows an arrangement for transferring air-sensitive substances 20 which have been prepared in the synthesis chamber and provided in closed vessels 32 into a plurality of test reactors 60, which, instead of a lock 40, each have only one suitable opening 62 for introducing the substances into the test reactor 60. The test reactors 60 are connected via protective means, for example connection lines, to a multiport valve 70, via which the individual substances 20 are assigned to the respective test reactors 60. The multiport valve 70 is preferably connected via a connection line to a pump 90 which transfers the substances 20 selected by the multiport valve 80 to the multiport valve 10. The multiport valve 80 determines the sequence in which the substances 20 are transferred by the pump 90 to the multiport valve 70 and then further into the test reactors 60. The multiport valves 70 and 80 can be of identical or different types.

LIST OF DESIGNATIONS

10—Synthesis
12—Carrier
14—Substance carrier
16—Substance receiving means
18—Substance metering unit
20—Substance, preferably air-sensitive
30—Transfer of the substances into the vessels 32
32—Vessel
34—Gas-tight cover
36—Closure apparatus
38—Transfer from the synthesis chamber
39—Robot (or other suitable apparatus)
40—Lock
41—Lock chamber
42—Lock door
44—Gas filler port
46—Gas outlet port
48—Lock door
50—Test reactor with attached lock 40
52—Gas filling direction
54—Gas outlet direction
60—Test reactor with charging opening 62
62—Charging opening on the test reactor 60
64—Connection line
70—Multiport valve
80—Multiport valve
90—Pump The disclosure of German Patent Application No. 100 59 633.9 filed Dec. 1, 2000 is hereby incorporated by reference in its entirety.

The foregoing embodiments have been shown for illustrative purposes and are not intended to limit the scope of the invention which is defined by claims.

What is claimed is:

1. An apparatus comprising:
   (a) a vessel with an opening, configured to accept a substance through the opening and further configured for the opening to be sealed;
   (b) a synthesis chamber configured to accept the vessel and further configured to establish or maintain a protective gas atmosphere when the vessel is present;
   (c) a test reactor configured to accept the vessel, and further configured to establish or maintain a protective gas atmosphere when the vessel is present;
   (d) means located within the test reactor to destroy the vessel in order to open the vessel and release the substance into the reactor, the means to destroy the vessel comprising a solvent to dissolve and destroy the vessel, a rotating stirring element to impact and destroy the vessel, or a mechanism to propel the vessel against the reactor to destroy the vessel; and
   (e) means for transferring the vessel, when sealed, from the synthesis chamber to the test reactor.

2. The apparatus of claim 1, wherein the vessel, when sealed, is air, moisture, or light impervious.

3. The apparatus of claim 1, wherein a gas-tight cover is used to seal the opening of the vessel.

4. The apparatus of claim 3, wherein the gas-tight cover is formed of the same material as the vessel.

5. The apparatus of claim 3, wherein the means to destroy the vessel destroys the gas-tight cover in order to open the vessel.

6. The apparatus of claim 1, wherein the vessel is sealed by covering the opening with a film, or a curable or viscous material.

7. The apparatus of claim 6, wherein the means to destroy the vessel destroys the film, or curable or viscous material in order to open the vessel.

8. The apparatus of claim 1, wherein the synthesis chamber is a glove box.

9. The apparatus of claim 1, wherein the protective gas is argon, nitrogen, helium or mixtures thereof.

10. The apparatus of claim 1, further comprising a lock connected to the test reactor, the lock being configured to establish a protective gas atmosphere around the vessel prior to the vessel being transfered into the test reactor.

11. The apparatus of claim 1, wherein the vessel is made from glass, ceramic, plastic, metal, or a composite material.

12. The apparatus of claim 1, wherein the vessel is made from a material that will dissolve in a solvent.

13. The apparatus of claim 1, wherein the means for transferring the vessel is a fully-automatic apparatus or a robot.

* * * * *